(12) United States Patent
Natsume (10) Patent No.: US 7,231,413 B2
(45) Date of Patent: Jun. 12, 2007

(54) TRANSPOSITION CIRCUIT (75) Inventor: Kenichi Natsume, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/766,484

(22) Filed: Jan. 29, 2004

(65) Prior Publication Data

US 2004/0186869 A1     Sep. 23, 2004

Related U.S. Application Data

(62) Division of application No. 09/584,549, filed on Jun. 1, 2000, now abandoned.

(30) Foreign Application Priority Data

Oct. 21, 1999    (JP)    ............................. 1999-299030

(51) Int. Cl.
*G06F 17/14*    (2006.01)
(52) U.S. Cl. .................................................... 708/401
(58) Field of Classification Search ................ 708/401, 708/400
See application file for complete search history.

(56) References Cited

U.S. PATENT DOCUMENTS 4,769,790 A     9/1988    Yamashita
6,021,420 A *  2/2000    Takamuki .................... 708/401

FOREIGN PATENT DOCUMENTS

| JP | 59-206960 | 11/1984 |
| JP | 62-267168 | 11/1987 |
| JP | 02-110641 | 4/1990 |
| JP | 11-053345 | 2/1999 |

* cited by examiner

*Primary Examiner*—Chuong D. Ngo
(74) *Attorney, Agent, or Firm*—Volentine & Whitt, P.L.L.C.

(57) ABSTRACT

The transposition circuit includes N input terminals (where N is an integer of 2 or greater) and N output terminals. This transposition circuit is configured such that when N packets of data for each matrix row are inputted in parallel to the corresponding input terminals, N packets of data are output in parallel for each matrix column from the corresponding output terminals. This transposition circuit generates data packets arranged as a transposed matrix and obtained from data packets in the form of an N×N matrix by interchanging the rows and columns of the original matrix.

10 Claims, 5 Drawing Sheets

| Period | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| S |  | 0 | 0 | 0 | 0 | 1 | 1 | 1 | 1 | 0 | 0 | 0 | 0 | 1 | 1 |
| $DI_1$ |  | d0 | d4 | d8 | d12 | d16 | d20 | d24 | d28 | d32 | d36 | d40 | d44 | d48 | d52 |
| $DI_2$ |  | d1 | d5 | d9 | d13 | d17 | d21 | d25 | d29 | d33 | d37 | d41 | d45 | d49 | d53 |
| $DI_3$ |  | d2 | d6 | d10 | d14 | d18 | d22 | d26 | d30 | d34 | d38 | d42 | d46 | d50 | d54 |
| $DI_4$ |  | d3 | d7 | d11 | d15 | d19 | d23 | d27 | d31 | d35 | d39 | d43 | d47 | d51 | d55 |
| $18_{1,1}$ | X | d0 | d4 | d8 | d12 | d13 | d14 | d15 | d19 | d32 | d36 | d40 | d44 | d45 |
| $18_{2,1}$ | X | d1 | d5 | d9 | d13 | d14 | d15 | d19 | d23 | d33 | d37 | d41 | d45 | d46 |
| $18_{3,1}$ | X | d2 | d6 | d10 | d14 | d15 | d19 | d23 | d27 | d34 | d38 | d42 | d46 | d47 |
| $18_{4,1}$ | X | d3 | d7 | d11 | d15 | d19 | d23 | d27 | d31 | d35 | d39 | d43 | d47 | d51 |
| $18_{1,2}$ | X | X | d0 | d4 | d8 | d9 | d10 | d11 | d18 | d19 | d32 | d36 | d40 | d41 |
| $18_{2,2}$ | X | X | d1 | d5 | d9 | d10 | d11 | d18 | d22 | d23 | d33 | d37 | d41 | d42 |
| $18_{3,2}$ | X | X | d2 | d6 | d10 | d11 | d18 | d22 | d26 | d27 | d34 | d38 | d42 | d43 |
| $18_{4,2}$ | X | X | d3 | d7 | d11 | d18 | d22 | d26 | d30 | d31 | d35 | d39 | d43 | d50 |
| $18_{1,3}$ | X | X | X | d0 | d4 | d5 | d6 | d7 | d17 | d18 | d19 | d32 | d36 | d37 |
| $18_{2,3}$ | X | X | X | d1 | d5 | d6 | d7 | d17 | d21 | d22 | d23 | d33 | d37 | d38 |
| $18_{3,3}$ | X | X | X | d2 | d6 | d7 | d17 | d21 | d25 | d26 | d27 | d34 | d38 | d39 |
| $18_{4,3}$ | X | X | X | d3 | d7 | d17 | d21 | d25 | d29 | d30 | d31 | d35 | d39 | d49 |
| $18_{1,4}$ | X | X | X | X | d0 | d1 | d2 | d3 | d16 | d17 | d18 | d19 | d32 | d33 |
| $18_{2,4}$ | X | X | X | X | d1 | d2 | d3 | d16 | d20 | d21 | d22 | d23 | d33 | d34 |
| $18_{3,4}$ | X | X | X | X | d2 | d3 | d16 | d20 | d24 | d25 | d26 | d27 | d34 | d35 |
| $18_{4,4}$ | X | X | X | X | d3 | d16 | d20 | d24 | d28 | d29 | d30 | d31 | d35 | d48 |
| $DO_1$ | X | X | X | X | X | d0 | d1 | d2 | d3 | d16 | d17 | d18 | d19 | d32 |
| $DO_2$ | X | X | X | X | X | d4 | d5 | d6 | d7 | d20 | d21 | d22 | d23 | d36 |
| $DO_3$ | X | X | X | X | X | d8 | d9 | d10 | d11 | d24 | d25 | d26 | d27 | d40 |
| $DO_4$ | X | X | X | X | X | d12 | d13 | d14 | d15 | d28 | d29 | d30 | d31 | d44 |

| Period | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SL | 0 | 1 | 2 | 3 | 0 | 1 | 2 | 3 | 0 | 1 | 2 | 3 | 0 | 1 |
| $A_1$ | 0 | 1 | 2 | 3 | 0 | 3 | 2 | 1 | 0 | 1 | 2 | 3 | 0 | 3 |
| $A_2$ | 0 | 1 | 2 | 3 | 1 | 0 | 3 | 2 | 0 | 1 | 2 | 3 | 1 | 0 |
| $A_3$ | 0 | 1 | 2 | 3 | 2 | 1 | 0 | 3 | 0 | 1 | 2 | 3 | 2 | 1 |
| $A_4$ | 0 | 1 | 2 | 3 | 3 | 2 | 1 | 0 | 0 | 1 | 2 | 3 | 3 | 2 |

| | | | | | | | | | | | | | | |
|---|---|---|---|---|---|---|---|---|---|---|---|---|---|---|
| $DI_1$ | d0 | d4 | d8 | d12 | d16 | d20 | d24 | d28 | d32 | d36 | d40 | d44 | d48 | d52 |
| $DI_2$ | d1 | d5 | d9 | d13 | d17 | d21 | d25 | d29 | d33 | d37 | d41 | d45 | d49 | d53 |
| $DI_3$ | d2 | d6 | d10 | d14 | d18 | d22 | d26 | d30 | d34 | d38 | d42 | d46 | d50 | d54 |
| $DI_4$ | d3 | d7 | d11 | d15 | d19 | d23 | d27 | d31 | d35 | d39 | d43 | d47 | d51 | d55 |

| | | | | | | | | | | | | | | |
|---|---|---|---|---|---|---|---|---|---|---|---|---|---|---|
| $26_1$ 0 | X | d0 | d0 | d0 | d0 | d16 | d16 | d16 | d16 | d32 | d32 | d32 | d32 | d48 |
| 1 | X | X | d7 | d7 | d7 | d7 | d7 | d7 | d29 | d29 | d39 | d39 | d39 | d39 |
| 2 | X | X | X | d10 | d10 | d10 | d10 | d26 | d26 | d26 | d26 | d42 | d42 | d42 |
| 3 | X | X | X | X | d13 | d13 | d23 | d23 | d23 | d23 | d23 | d23 | d45 | d45 |
| $26_2$ 0 | X | d1 | d1 | d1 | d1 | d1 | d20 | d20 | d20 | d33 | d33 | d33 | d33 | d33 |
| 1 | X | X | d4 | d4 | d4 | d17 | d17 | d17 | d17 | d17 | d36 | d36 | d36 | d49 |
| 2 | X | X | X | d11 | d11 | d11 | d11 | d11 | d30 | d30 | d30 | d43 | d43 | d43 |
| 3 | X | X | X | X | d14 | d14 | d14 | d27 | d27 | d27 | d27 | d27 | d46 | d46 |
| $26_3$ 0 | X | d2 | d2 | d2 | d2 | d2 | d2 | d24 | d24 | d34 | d34 | d34 | d34 | d34 |
| 1 | X | X | d5 | d5 | d5 | d5 | d21 | d21 | d21 | d21 | d37 | d37 | d37 | d37 |
| 2 | X | X | X | d8 | d8 | d18 | d18 | d18 | d18 | d18 | d18 | d40 | d40 | d50 |
| 3 | X | X | X | X | d15 | d15 | d15 | d15 | d31 | d31 | d31 | d31 | d47 | d47 |
| $26_4$ 0 | X | d3 | d3 | d3 | d3 | d3 | d3 | d3 | d28 | d35 | d35 | d35 | d35 | d35 |
| 1 | X | X | d6 | d6 | d6 | d6 | d6 | d25 | d25 | d25 | d38 | d38 | d38 | d38 |
| 2 | X | X | X | d9 | d9 | d9 | d22 | d22 | d22 | d22 | d22 | d41 | d41 | d41 |
| 3 | X | X | X | X | d12 | d19 | d19 | d19 | d19 | d19 | d19 | d19 | d44 | d51 |

| | | | | | | | | | | | | | | |
|---|---|---|---|---|---|---|---|---|---|---|---|---|---|---|
| $DO_1$ | X | X | X | X | X | d0 | d1 | d2 | d3 | d16 | d17 | d18 | d19 | d32 |
| $DO_2$ | X | X | X | X | X | d4 | d5 | d6 | d7 | d20 | d21 | d22 | d23 | d36 |
| $DO_3$ | X | X | X | X | X | d8 | d9 | d10 | d11 | d24 | d25 | d26 | d27 | d40 |
| $DO_4$ | X | X | X | X | X | d12 | d13 | d14 | d15 | d28 | d29 | d30 | d31 | d44 |

FIG.5(A) FIG.5(B) FIG.5(C)

TRANSPOSITION CIRCUIT

CROSS REFERENCE TO RELATED APPLICATIONS

This is a divisional application of application Ser. No. 09/584,549, filed Jun. 1, 2000, now abandoned, which is hereby incorporated by reference in its entirety for all purposes.

BACKGROUND OF THE INVENTION

1. Field of the Invention

The present invention relates to transposition circuit for transposing matrix data (data packets in the form of matrices) in order, for example, to perform discrete cosine transform or another procedure.

2. Description of Related Art

Figures 5A, 5B, 5C:
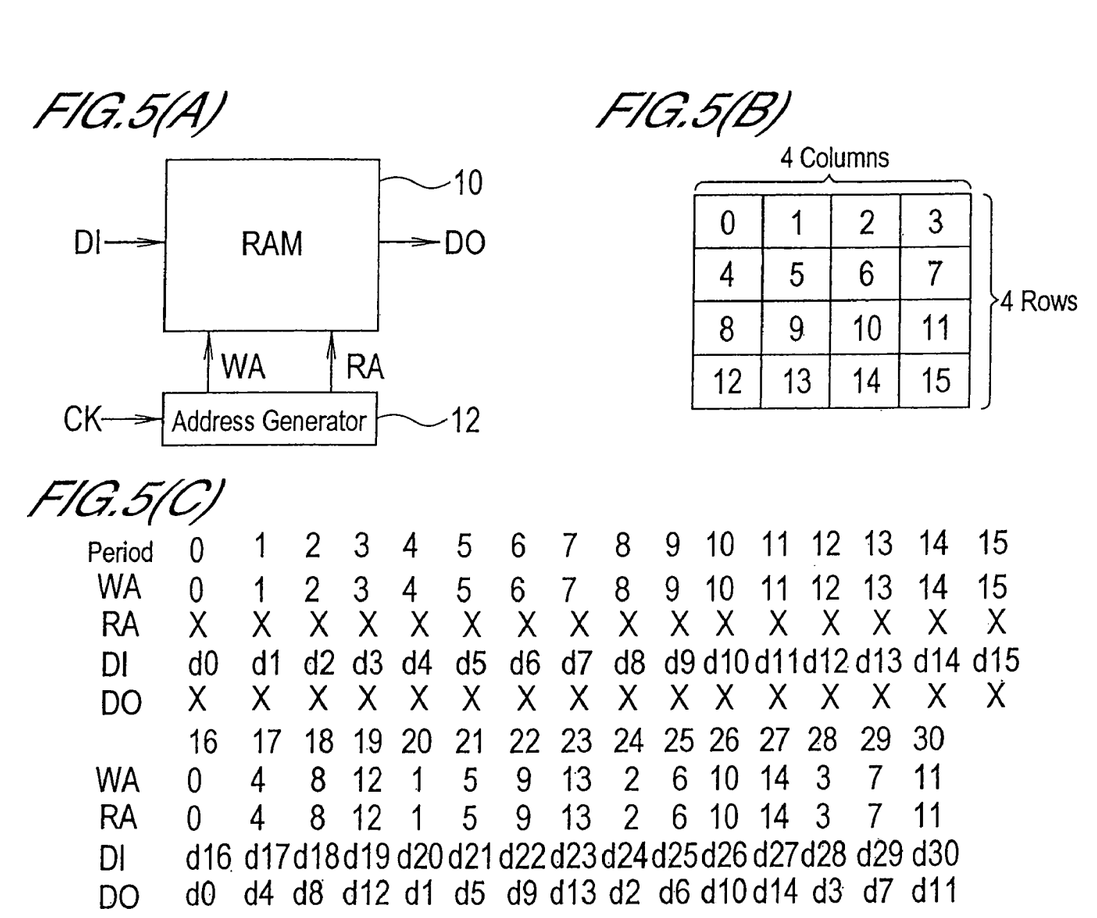
FIGS. 5A, 5B, and 5C are diagrams illustrating conventional transposition of matrix data.

FIGS. 5(A)–5(C) are diagrams illustrating conventional transposition of matrix data. FIG. 5A is a block diagram depicting the structure of a transposition circuit. FIG. 5B is an image diagram depicting memory content. FIG. 5C is a timing chart depicting the operation of a transposition circuit.

A transposition circuit comprises a random-access memory (hereinafter "RAM") 10 and an address generator 12, as shown in FIG. 5A. RAM 10 is equipped with an input port and an output port. The address generator 12 generates a write address WA and a read address RA on the basis of a clock signal CK. Input data DI inputted to the input port of RAM 10 is written to the storage area in RAM 10 specified by the write address WA. To read data from RAM 10, the storage area in the RAM 10 where this data is stored is specified by the read address RA. The data thus read is outputted as output data DO from the output port of RAM 10. The address generator 12 can specify the write address WA and the read address RA separately. Consequently, RAM 10 allows data to be read and written independently and concurrently.

Such circuit architecture allows the read sequence of output data DO to be varied in conformity with the write sequence of the input data DI sequentially inputted in matrix format. Output data DO can therefore be converted to a transposed matrix format.

FIG. 5B depicts the storage areas of RAM 10. Numbers in the drawing indicate addresses of storage areas. In this example, data arranged as a 4×4 matrix is processed, so 16 storage areas designated by symbols 0 to 15 are provided to RAM 10.

Transposition of data arranged as a 4×4 matrix will now be described with reference to FIG. 5C.

During periods 0 to 15, the first 16 data d0 to d15 are inputted as input data DI to RAM 10 according the aforementioned sequence in sync with clock signals CK. The address generator 12 outputs write addresses WA 0 to 15 for the corresponding data d0 to d15. Data d0 to d15 are thereby stored to the corresponding addresses 0 to 15 of RAM 10.

During period 16, the address generator 12 generates address 0 as a read address RA. In accordance with this, data d0 stored at address 0 of RAM 10 is outputted as output data DO. During period 16, the address generator 12 also outputs address 0 as a write address WA. In accordance with this, data d16 provided as input data DI is stored to address 0 of RAM 10.

During period 17, the address generator 12 outputs address 4 as a read address RA. In accordance with this, data d4 stored at address 4 of RAM 10 is outputted as output data DO. During period 17, the address generator 12 also outputs address 4 as a write address WA. In accordance with this, data d17 provided as input data DI is stored to address 4 of RAM 10.

Similarly, during periods 18, 19, 20, 21, . . . the address generator 12 outputs addresses 8, 12, 1, 5, . . . as read addresses RA. In accordance with this, data d8, d12, d1, d5, . . . stored at addresses 8, 12, 1, 5, . . . of RAM 10 are outputted as output data DO. In these periods 18, 19, 20, 21, . . . the address generator 12 also outputs addresses 8, 12, 1, 5, . . . as write addresses WA. In accordance with this, data d18, d19, d20, d21, . . . provided as input data DI are stored to addresses 8, 12, 1, 5, . . . of RAM 10.

Thus, data d0, d1, d2, and d3 corresponding to the components in the first row of the matrix are first written to RAM 10 in the order indicated. Data d4, d5, d6, and d7 corresponding to the components in the second row of the matrix are then written to RAM 10 in the order indicated. Data d8, d9, d10, and d11 corresponding to the components in the third row of the matrix are subsequently written to RAM 10 in the order indicated. Data d12, d13, d14, and d15 corresponding to the components in the fourth row of the matrix are written after that to RAM 10 in the order indicated.

Data d0, d4, d8, and d12 corresponding to the components in the first column of the matrix are read from RAM 10 in the order indicated. Data d1, d5, d9, and d13 corresponding to the components in the second column of the matrix are subsequently read from RAM 10 in the order indicated. Data d2, d6, d10, and d14 corresponding to the components in the third column of the matrix are then read from RAM 10 in the order indicated. Data d3, d7, d11, and d15 corresponding to the components in the fourth column of the matrix are read after that from RAM 10 in the order indicated.

Matrix data inputted to the transposition circuit is thus converted to data arranged as a matrix obtained by interchanging the rows and columns of the original matrix.

Conventional transposition circuits, however, are configured such that a single data packet is read or written per period. A processing time of $2N^2$ periods will therefore be needed to process data arranged as an N×N matrix (where N is an integer of 2 or greater). A resulting disadvantage is that the processing time increases dramatically with increased matrix size.

SUMMARY OF THE INVENTION

With the foregoing in view, it is an object of the present invention to provide a transposition circuit having a shorter processing time than in the past.

To attain the stated object, the transposition circuit of the present invention is provided with the following unique structure. Specifically, the transposition circuit of the present invention generates data packets arranged as a transposed matrix and obtained from data packets in the form of an N×N matrix (where N is an integer of 2 or greater) by interchanging the rows and columns of the original matrix. According to the present invention, the transposition circuit is provided with N input terminals and N output terminals. Another feature of the present invention is that N packets of data are outputted in parallel for each matrix column from the output terminals when N packets of data are inputted in parallel for each matrix row to the input terminals.

The rows and columns of matrices are thus interchanged because data is inputted by matrix row and outputted by matrix column. Data packets arranged as a matrix can thereby be converted by this transposition circuit to data packets arranged as a transposed matrix in relation to the original matrix.

Yet another feature of this transposition circuit is that processing speed can be increased because a plurality of data packets can be processed in parallel during a single period. Specifically, the processing time is 2N periods because N data packets are processed during each period. In other words, the processing time is reduced to 1/N of conventional time.

According to a preferred embodiment of the present invention, the transposition circuit is provided with a control unit and N×N registers arranged in N rows and N columns. A first column of registers and an N-th row of registers are coupled with input terminals, and a first row of registers and an N-th column of registers are coupled with output terminals. The control unit specifies a first transfer mode or a second transfer mode.

In the first transfer mode, data inputted to the input terminals is stored in the first column of registers, data stored in an n-th column (where n is an integer from 1 to (N−1)) of registers is transferred to an (n+1)-th column of registers, and data stored in an N-th column of registers is outputted to the output terminals.

In the second transfer mode, data inputted to the input terminals is stored in the N-th row of registers, data stored in an m-th row (where m is an integer from 2 to N) of registers is transferred to an (m−1)-th row of registers, and data stored in the first row of registers is outputted to the output terminals.

In this transposition circuit, the control unit thus selects either the first column of registers or the N-th row of registers as the storage location for inputted data. In addition, the transposition circuit is such that a plurality of registers are disposed between the input terminals and output terminals, and the direction of data transfer between the registers is controlled by the control unit. Another feature of this transposition circuit is that the control unit outputs data stored in a selected register by selecting either the N-th column of registers or the first row of registers. This structure allows data inputted by matrix row to be outputted by matrix column.

According to another preferred embodiment of the present invention, the transposition circuit is provided with N×N registers arranged in N rows and N columns, N×N first selectors whose output ports are individually connected to the input ports of these registers, (N−1) second selectors whose output ports are individually connected to the output terminals, and a control unit.

These first and second selectors have first and second ports. Either the first or second ports are used as input ports in accordance with control signals from the control unit.

The first ports of the first selectors in an i-th row and a first column (where i is an integer between 1 and N), and the second ports of the first selectors in an N-th row and (N+1−i)-th column are connected to No. i input terminals. The output ports of the registers in an m-th row and n-th column (where m is an integer between 2 and N, and n is an integer between 1 and (N−1)) are connected to the second ports of the first selectors in an (m−1)-th row and n-th column and to the first ports of the first selectors in the m-th row and (n+1)-th column. The output ports of the registers in the m-th row and N-th column are connected to the first ports of No. (m−1) second selectors. The output ports of the registers in a first row and the n-th column are connected to the second ports of No. (N−n) second selectors. The output ports of the registers in the first row and N-th column are connected to No. 1 output terminals. The output ports of No. n second selectors are connected to No. (n+1) output terminals.

In this transposition circuit, the control unit thus selects either the first column of registers or the N-th row of registers as the storage location for inputted data by selecting the input ports of the first selectors. In addition, the transposition circuit is such that a plurality of registers are disposed between the input terminals and output terminals, and the direction of data transfer between the registers is controlled by the control unit via the first selectors. Another feature of this transposition circuit is that the control unit selects either the N-th column of registers or the first row of registers and outputs data stored in selected registers by selecting the input ports of the second selectors. This structure allows data inputted by matrix row to be outputted by matrix column.

According to yet another preferred example of the present invention, the transposition circuit is provided with N memory units whose storage areas accommodate N data packets, N first selectors whose output ports are individually connected to the input ports of these memory units, N second selectors whose output ports are individually connected to the output terminals, and a control unit.

The first and second selectors have N ports. Any of these ports is used as an input port for the first and second selectors in accordance with selection signals from the control unit.

The ports of the first selectors are connected to the corresponding input terminals. The ports of the second selectors are connected to the output ports of the corresponding memory units.

The control unit specifies prescribed storage areas in the memory units and generates, together with the selection signals, address signals for reading data from the memory units and writing data to the memory units.

With the transposition circuit thus configured, data inputted in parallel by row to the input terminals is sent to the prescribed ports of first selectors. The prescribed ports of the first selectors are selected as input ports by the selection signals from the control unit, and data sent to these input ports is stored in the prescribed memory units. Data inputted in parallel is therefore stored in separate memory units. The data storage locations in the memory units are specified by the address signals from the control unit.

Data stored at the storage locations specified by the address signals is read from the memory in accordance with address signals from the control unit. The data thus read is sent to the prescribed ports of second selectors. The prescribed ports of the second selectors are selected as input ports by the selection signals from the control unit. Data sent to these input ports is outputted to prescribed output terminals. This structure allows data inputted by matrix row to be outputted by matrix column.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Embodiments of the transposition circuit of the present invention will now be described through examples with reference to drawings. The drawings used in the description are merely schematic representations of the manner in which constituent components are arranged or connected in relation to each other. These drawings are used solely to illustrate the present invention. The same symbols are used in the drawings to designate identical constituent components, and redundant descriptions thereof are sometimes omitted. In addition, the devices, numerical conditions, and other elements referred to hereinbelow are merely examples that do not exceed the scope of the present invention, which is not limited by these examples.

EXAMPLE 1

Figure 1:
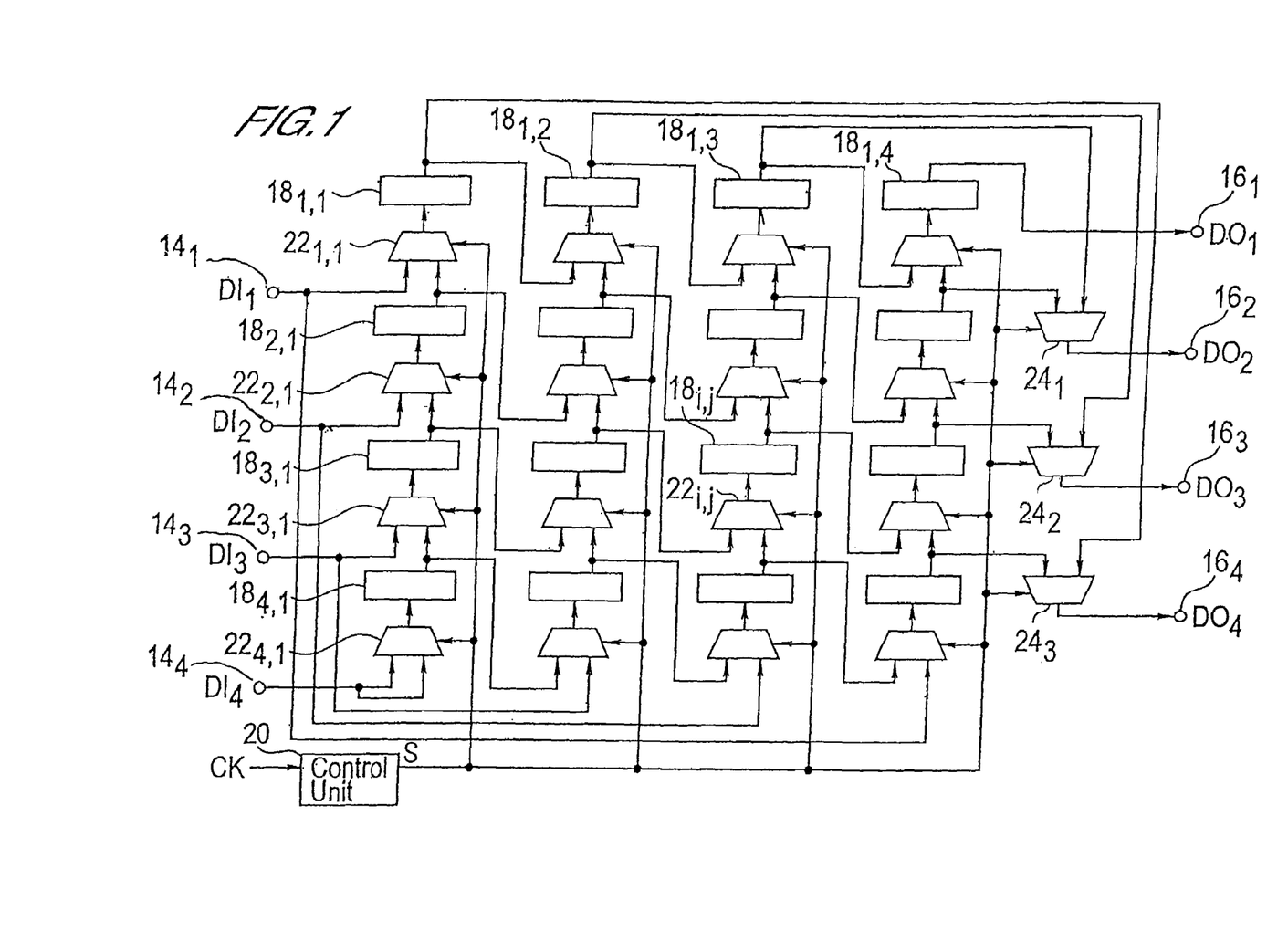
FIG. 1 is a block diagram depicting the transposition circuit of a first embodiment.

FIG. 1 is a block diagram depicting the structure of the transposition circuit of the first embodiment. This transposition circuit generates data packets arranged as a transposed matrix and obtained from data packets in the form of an N×N matrix (where N is a integer of 2 or greater; in the case under consideration, N=4) by interchanging the rows and columns of the original matrix.

The transposition circuit comprises N input terminals $14_i$ (where i is an integer between 1 and N) and N output terminals $16_i$. This transposition circuit is configured such that when N packets of data are inputted in parallel for each matrix row to the corresponding input terminals $14_i$, N packets of data are outputted in parallel for each matrix column from the corresponding output terminals $16_i$.

The transposition circuit also comprises a control unit 20 and N×N registers $18_{i,j}$ (where i and j are integers between 1 and N) arranged in N rows and N columns. The transposition circuit further comprises N×N first selectors $22_{i,j}$ whose output ports are individually connected to the input ports of the registers $18_{i,j}$. The transposition circuit additionally comprises (N−1) second selectors $24_n$ whose output ports are individually connected to output terminals $16_{n+1}$ (where n is an integer between 1 and (N−1)).

The aforementioned first selectors $22_{i,j}$ and second selectors $24_n$ have first and second ports, respectively. The first or second ports are used as input ports for the first selectors $22_{i,j}$ and second selectors $24_n$, in accordance with control signals S from the control unit 20.

The aforementioned control unit 20 generates control signals S for the first selectors $22_{i,j}$ and second selectors $24_n$ on the basis of clock signals CK. For example, the first selectors $22_{i,j}$ and the second selectors $24_n$ select first ports as the input ports (first transfer mode) when the control signals S are logical zeros, and second ports as the input ports (second transfer mode) when the control signals S are logical ones. The transposition circuit thus operates in a transfer mode that corresponds to the logical values of the control signals S.

In the transposition circuit, the first port of a first selector $22_{i,1}$ in an i-th row and a first column and the second port of a first selector $22_{i,\ N+1-i}$ in an N-th row and (N+1−i)-th column are connected to No. i input terminal $14_i$.

The output port of a register $18_{m,n}$ in an m-th row and n-th column (where m is an integer between 2 and N, and n is an integer between 1 and (N−1)) is connected to the second port of a first selector $22_{m-1,n}$ in an (m−1)-the row and n-th column and to the first port of a first selector $22_{m,\ n+1}$ in an m-th row and (n+1)-th column.

The output port of register $18_{m,N}$ in an m-th row and N-th column is connected to the first port of No. (m−1) second selector $24_{m-1}$.

The output port of register $18_{1,n}$ in a first row and an n-th column is connected to the second port of No. (N−n) second selector $24_{N-n}$.

The output port of register $18_{1,N}$ in the first row and N-th column is connected to No. 1 output terminal $16_i$.

The output port of No. n second selector $24_n$ is connected to No. (n+1) output terminal $16_{n+1}$.

The registers $18_{i,1}$ of the first column are thus coupled with the input terminals $14_i$ via the first selectors $22_{i,1}$. The registers $18_{N,j}$ of the N-th row are coupled with the input terminals $14_i$ via the first selectors $22_{N,j}$. The registers $18_{1,j}$ of the first row are coupled with the output terminals $16_i$ either directly or via the second selectors $24_n$. The registers $18_{i,N}$ of the N-th column are coupled with the output terminals $16_i$ either directly or via the second selectors $24_n$.

With this transposition circuit, data inputted to an input terminal $14_i$ is stored in a register $18_{i,1}$ in the first column when the control unit 20 specifies the first transfer mode. At the same time, data stored in register $18_{i,n}$ in the n-th column is transferred to register $18_{i,\ n+1}$ in the (n+1)-th column, and data stored in register $18_{N,j}$ in the N-th column is outputted to the output terminal $16_i$.

Data inputted to an input terminal $14_i$ is stored in a register $18_{N,j}$ in the N-th row when the control unit 20 specifies the second transfer mode. At the same time, data stored in register $18_{m,j}$ in the m-th row is transferred to register $18_{m-1,\ j}$ in the (m−1)-th row, and data stored in register $18_{i,j}$ in the first row is outputted to the output terminal $16_i$.

Figure 2:
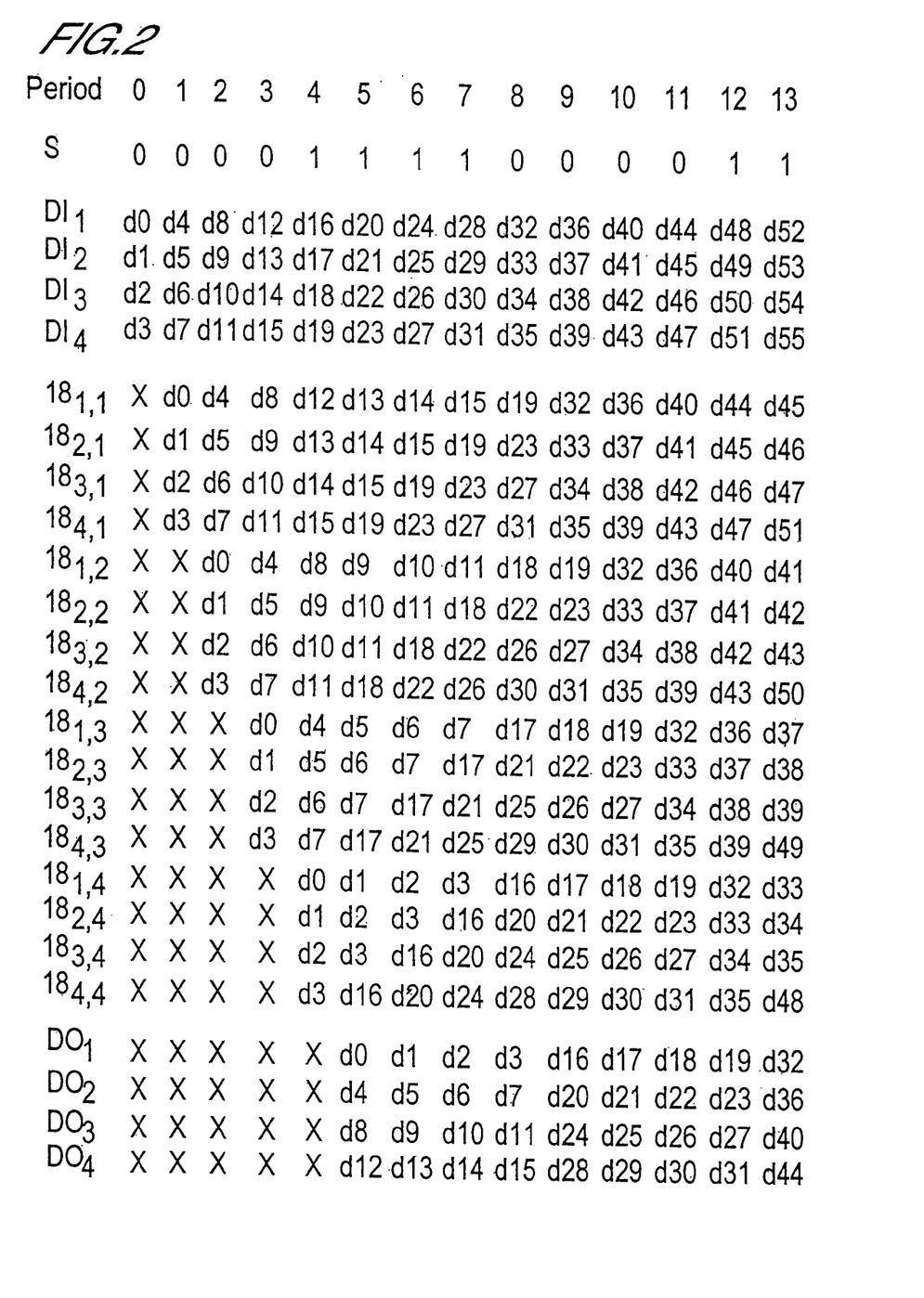
FIG. 2 is a timing chart depicting the operation of the transposition circuit of the first embodiment.

The operation of the transposition circuit of the first embodiment will now be described in detail with reference to FIG. 2. FIG. 2 is a timing chart depicting the operation of the transposition circuit of the first embodiment.

In this transposition circuit, data d0 to d15, d16 to d31, d32 to d47, . . . in a 4×4 matrix format are inputted in parallel as input data $DI_i$ in groups of four packets to input terminals $14_i$. The data is outputted in parallel as output data $DO_i$ in groups of four packets from output terminals $16_i$.

The logical value of the control signal S outputted by the control unit 20 during periods 0 to 3 is set to 0, as shown in FIG. 2. In accordance with this, the transposition circuit operates in the above-described first transfer mode during periods 1 to 4.

During period 0, data d0 to d3 are inputted to input terminals $14_1$ to $14_4$ as input data $DI_1$ to $D_4$, respectively.

During period 1, the data d0, d1, d2, and d3 inputted to the input terminals $14_1$ to $14_4$ during period 0 are written to the registers $18_{1,1}$, $18_{2,1}$, $18_{3,1}$, and $18_{4,1}$, respectively, via the first selectors $22_{1,1}$, $22_{2,1}$, $22_{3,1}$, and $22_{4,1}$. During period 1, data d4 to d7 are also inputted as input data $DI_1$ to $DI_4$ to the input terminals $14_1$ to $14_4$, respectively.

During period 2, the data d0, d1, d2, and d3 stored in the registers $18_{1,1}$ to $18_{4,1}$ during period 1 are written to the registers $18_{1,2}$, $18_{2,2}$, $18_{3,2}$, and $18_{4,2}$, respectively, via the first selectors $22_{1,2}$, $22_{2,2}$, $22_{3,2}$, and $22_{4,2}$. During period 2, the data d4, d5, d6, and d7 inputted to the input terminals $14_1$ to $14_4$ during period 1 are written to the registers $18_{1,1}$, $18_{2,1}$, $18_{3,1}$, and $18_{4,1}$, respectively, via the first selectors $22_{1,1}$, $22_{2,1}$, $22_{3,1}$, and $22_{4,1}$. During period 2, data d8 to d11 are also inputted as input data $DI_1$ to $DI_4$ to the input terminals $14_1$ to $14_4$, respectively.

During period 3, the data d0, d1, d2, and d3 stored in the registers $18_{1,2}$ to $18_{4,2}$ during period 2 are written to the registers $18_{1,3}$, $18_{2,3}$, $18_{3,3}$, and $18_{4,3}$, respectively, via the first selectors $22_{1,3}$, $22_{2,3}$, $22_{3,3}$, and $22_{4,3}$. During period 3, the data d4, d5, d6, and d7 stored in the registers $18_1$, to $18_{4,1}$ during period 2 are written to the registers $18_{1,2}$, $18_{2,2}$, $18_{3,2}$, and $18_{4,2}$, respectively, via the first selectors $22_{1,2}$, $22_{2,2}$, $22_{3,2}$, and $22_{4,2}$. During period 3, the data d8, d9, d10, and d11 inputted to the input terminals $14_1$ to $14_4$ during period 2 are written to the registers $18_{1,1}$, $18_{2,1}$, $18_{3,1}$, and $18_{4,1}$, respectively, via the first selectors $22_{1,1}$, $22_{2,1}$, $22_{3,1}$, and $22_{4,1}$. During period 3, data d12 to d15 are also inputted as input data $DI_1$ to $DI_4$ to the input terminals $14_1$ to $14_4$, respectively.

During period 4, the data d0, d1, d2, and d3 stored in the registers $18_{1,3}$ to $18_{4,3}$ during period 3 are written to the registers $18_{1,4}$, $18_{2,4}$, $18_{3,4}$, and $18_{4,4}$, respectively, via the first selectors $22_{1,4}$, $22_{2,4}$, $22_{3,4}$, and $22_{4,4}$. During period 4, the data d4, d5, d6, and d7 stored in the registers $18_{1,2}$ to $18_{4,2}$ during period 3 are written to the registers $18_{1,3}$, $18_{2,3}$, $18_{3,3}$, and $18_{4,3}$, respectively, via the first selectors $22_{1,3}$, $22_{2,3}$, $22_{3,3}$, and $22_{4,3}$. During period 4, the data d8, d9, d10, and d11 stored in the registers $18_{1,1}$ to $18_{4,1}$ during period 3 are written to the registers $18_{1,2}$, $18_{2,2}$, $18_{3,2}$, and $18_{4,2}$, respectively, via the first selectors $22_{1,2}$, $22_{2,2}$, $22_{3,2}$, and $22_{4,2}$. During period 4, the data d12, d13, d14, and d15 inputted to the input terminals $14_1$ to $14_4$ during period 3 are written to the registers $18_{1,1}$, $18_{2,1}$, $18_{3,1}$, and $18_{4,1}$, respectively, via the first selectors $22_{1,1}$ $22_{2,1}$, $22_{3,1}$, and $22_{4,1}$. During period 4, data d16 to d19 are also inputted as input data $DI_1$ to $DI_4$ to the input terminals $14_1$ to $14_4$, respectively.

Data is thus transferred in the direction of the row arrangement of the registers $18_{i,j}$ during periods 1 to 4.

During period 4, the logical value of the control signal S outputted by the control unit 20 is switched to "1." During the subsequent periods 4 to 7, the logical value of the control signal S outputted by the control unit 20 is set to "1." Consequently, the transposition circuit operates in the above-described second transfer mode during periods 5 to 8.

During period 5, the data d0, d4, d8, and d12 stored in the registers $18_{1,4}$, $18_{1,3}$, $18_{1,2}$, and $18_{1,1}$ during period 4 are outputted to the output terminals $16_1$, $16_2$, $16_3$, and $16_4$, respectively, either directly or via the second selectors $24_1$ to $24_3$.

During period 5, the data d1, d5, d9, and d13 stored in the registers $18_{2,4}$, $18_{2,3}$, $18_{2,2}$, and $18_{2,1}$ during period 4 are written to the registers $18_{1,4}$, $18_{1,3}$, $18_{1,2}$, and $18_{1,1}$, respectively, via the first selectors $22_{1,4}$, $22_{1,3}$, $22_{1,2}$, and $22_{1,1}$. During period 5, the data d2, d6, d10, and d14 stored in the registers $18_{3,4}$, $18_{3,3}$, $18_{3,2}$, and $18_{3,1}$ during period 4 are also written to the registers $18_{2,4}$, $18_{2,3}$, $18_{2,2}$, and $18_{2,1}$, respectively, via the first selectors $22_{2,4}$, $22_{2,3}$, $22_{2,2}$, and $22_{2,1}$. During period 5, the data d3, d7, d11, and d15 stored in the registers $18_{4,4}$, $18_{4,3}$, $18_{4,2}$, and $18_{4,1}$ during period 4 are also written to the registers $18_{3,4}$, $18_{3,3}$, $18_{3,2}$, and $18_{3,1}$, respectively, via the first selectors $22_{3,4}$, $22_{3,3}$, $22_{3,2}$, and $22_{3,1}$. During period 5, the data d16, d17, d18, and d19 inputted to the input terminals $14_1$ to $14_4$ during period 4 are also written to the registers $18_{4,4}$, $18_{4,3}$, $18_{4,2}$, and $18_{4,1}$, respectively, via the first selectors $22_{4,4}$, $22_{4,3}$, $22_{4,2}$, and $22_{4,1}$. During period 5, data d20 to d23 are also inputted as input data $DI_1$ to $DI_4$ to the input terminals $14_1$ to $14_4$, respectively.

Similarly, data is transferred in the direction of the column arrangement of the registers $18_{i,j}$ during periods 6 to 8.

Consequently, data d1, d5, d9, and d13 are outputted from the output terminals $16_1$, $16_2$, $16_3$, and $16_4$, respectively, during period 6. During period 7, data d2, d6, d10, and d14 are outputted from the output terminals $16_1$, $16_2$, $16_3$, and $16_4$, respectively. During period 8, data d3, d7, d11, and d15 are outputted from the output terminals $16_1$, $16_2$, $16_3$, and $16_4$, respectively.

During period 8, the logical value of the control signal S outputted by the control unit 20 is switched to "0." During the subsequent periods 8 to 11, the logical value of the control signal S outputted by the control unit 20 is set to "0." Consequently, the transposition circuit operates in the above-described first transfer mode during periods 9 to 12. Data is thus transferred in the direction of the row arrangement of the registers $18_{i,j}$ during periods 9 to 12.

Consequently, data d16, d20, d24, and d28 are outputted from the output terminals $16_1$ to $16_4$, respectively, during period 9. During period 10, data d17, d21, d25, and d29 are outputted from the output terminals $16_1$ to $16_4$, respectively. During period 11, data d18, d22, d26, and d30 are outputted from the output terminals $16_1$ to $16_4$, respectively. During period 12, data d19, d23, d27, and d31 are outputted from the output terminals $16_1$ to $16_4$, respectively.

The transposition circuit then continues to change the data arrangement sequence while switching between transfer modes every four periods.

The transposition circuit thus outputs data in parallel in packets of four for each matrix column when this data is inputted in parallel in packets of four for each matrix row. In other words, data packets inputted as a matrix are outputted as data packets in the form of a transposed matrix obtained by interchanging the rows and columns of the original matrix.

In addition, the time needed to process the data packets of a single matrix corresponds to 2N periods because N data packets are processed by the transposition circuit during each period. The processing time is thus reduced to 1/N of conventional time.

Another feature of the proposed transposition circuit is that it is sufficient for the control signal S of the control unit 20 to be alternated between "0" and "1" in matrix units. This transposition circuit is therefore advantageous in that it has a comparatively simple circuit architecture.

The first selector $22_{N,1}$ (corresponds to the first selectors $22_{4,1}$ in FIG. 1) in the first column and the N-th row may also be dispensed with. In the absence of the first selector $22_{N,1}$, No. N input terminal $14_N$ should be connected directly to the input port of the register $18_{N,1}$ in the first column and the N-th row.

EXAMPLE 2

Figure 3:
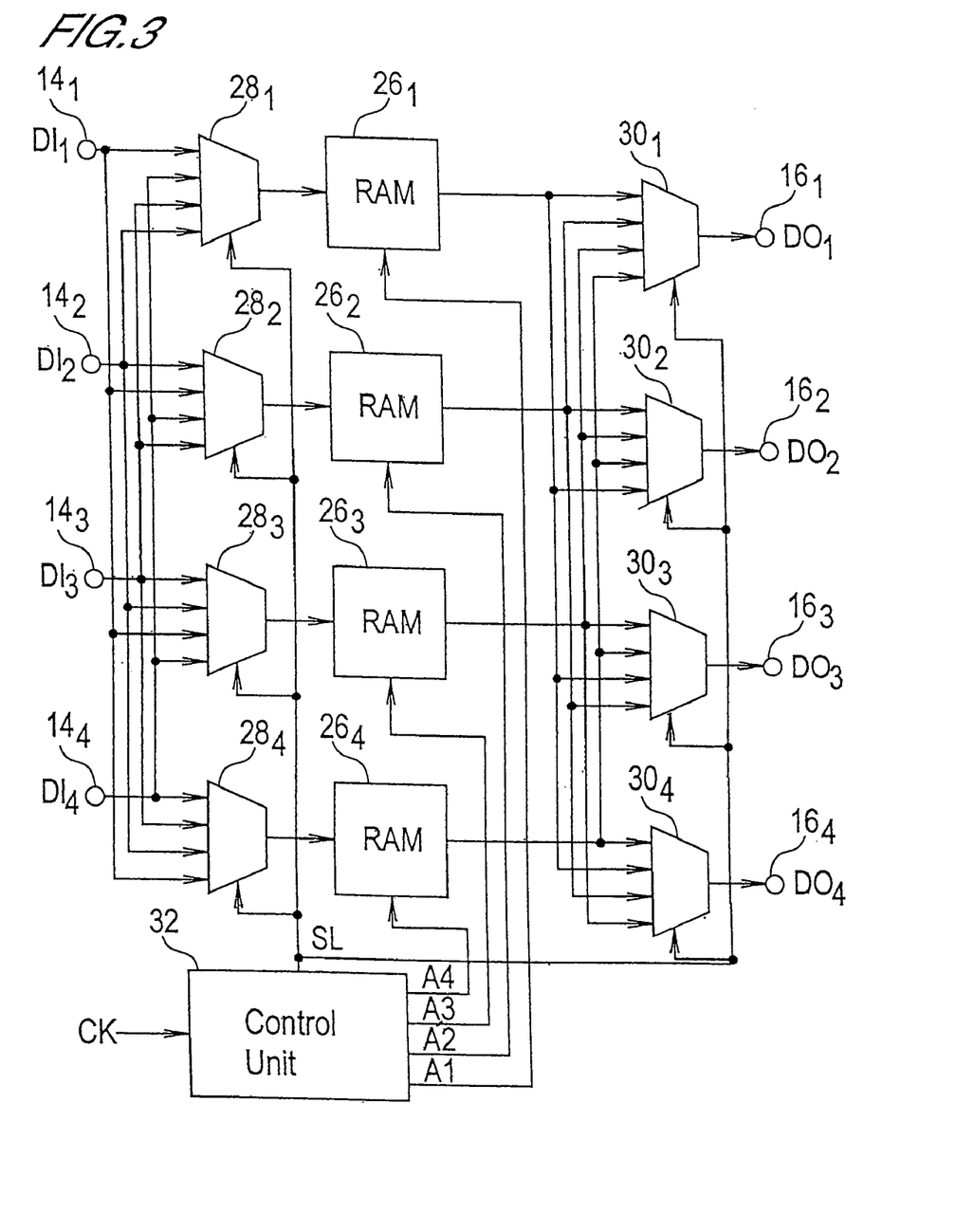
FIG. 3 is a block diagram depicting the transposition circuit of a second embodiment.

FIG. 3 is a block diagram depicting the structure of the transposition circuit of a second embodiment. This transposition circuit generates data packets arranged as a transposed matrix and obtained from data packets in the form of an N×N matrix (where N is a integer of 2 or greater; in the case under consideration, N=4) by interchanging the rows and columns of the original matrix.

The transposition circuit comprises N input terminals $14_i$ (where i is an integer between 1 and N) and N output terminals $16_i$. This transposition circuit is configured such that when N packets of data are inputted in parallel for each matrix row to the corresponding input terminals $14_i$, N packets of data are outputted in parallel for each matrix column from the corresponding output terminals $16_i$.

The transposition circuit is also provided with N units of random access memory (hereinafter "RAM") $26_i$ whose storage areas are used to store N packets of data. RAM $26_i$ has input ports and output ports. The transposition circuit also has N first selectors $28_i$ whose output ports are individually connected to the input ports of the memory $26_i$. The transposition circuit further has N second selectors $30_i$ whose output ports are individually connected to output terminals $16_i$. The transposition circuit also has a control unit 32.

The aforementioned first selectors $28_i$ and second selectors $30_i$ have N input ports for each type of selector. Ports of either type are used as input ports for the first selectors $28_i$ and second selectors $30_i$ in accordance with selection signals SL from the control unit 32.

The aforementioned control unit 32 generates selection signals SL for the first selectors $28_i$ and second selectors $30_i$ on the basis of clock signals CK. For example, the first selectors $28_i$ and the second selectors $30_i$ select first, second, third, and fourth ports as input ports when the selection signals SL assume the values of 0, 1, 2, and 3.

The above-described control unit 32 generates selection signals SL and produces address signals $A_i$ for RAM $26_i$ on the basis of clock signals CK. Prescribed storage areas of RAM $26_i$ are specified in accordance with the values of the address signals $A_i$, and data is read from and written to the specified storage areas. For example, addresses 0, 1, 2, and 3 are specified as the storage areas of RAM $26_i$ when the address signals $A_i$ assume the values of 0, 1, 2, and 3. In the transposition circuit, read addresses and write addresses are specified by common address signals $A_i$ because data is read from and written to common storage areas during any given period.

In the transposition circuit, the ports of the first selectors $28_i$ are connected to the corresponding input terminals $14_j$ (where j is an integer between 1 and N) Specifically, No. 1 input terminal $14_1$ is connected to the first port of No. 1 first selector $28_1$, the second port of No. 2 first selector $28_2$, the third port of No. 3 first selector $28_3$, and the fourth port of No. 4 first selector $28_4$.

No. 2 input terminal $14_2$ is connected to the fourth port of No. 1 first selector $28_1$, the first port of No. 2 first selector $28_2$, the second port of No. 3 first selector $28_3$, and the third port of No. 4 first selector $28_4$.

No. 3 input terminal $14_3$ is connected to the third port of No. 1 first selector $28_1$, the fourth port of No. 2 first selector $28_2$, the first port of No. 3 first selector $28_3$, and the second port of No. 4 first selector $28_4$.

No. 4 input terminal $14_4$ is connected to the second port of No. 1 first selector $28_1$, the third port of No. 2 first selector $28_2$, the fourth port of No. 3 first selector $28_3$, and the first port of No. 4 first selector $28_4$.

In the transposition circuit, the input ports of the second selectors $30_i$ are connected to the output terminals of the corresponding RAM $26_i$.

Specifically, the output port of No. 1 RAM $26_1$ is connected to the first port of No. 1 second selector $30_1$, the fourth port of No. 2 second selector $30_2$, the third port of No. 3 second selector $30_3$, and the second port of No. 4 second selector $30_4$.

The output port of No. 2 RAM $26_2$ is connected to the second port of No. 1 second selector $30_1$, the first port of No. 2 second selector $30_2$, the fourth port of No. 3 second selector $30_3$, and the third port of No. 4 second selector $30_4$.

The output port of No. 3 RAM $26_3$ is connected to the third port of No. 1 second selector $30_1$, the second port of No. 2 second selector $30_2$, the first port of No. 3 second selector $30_3$, and the fourth port of No. 4 second selector $30_4$.

The output port of No. 4 RAM $26_4$ is connected to the fourth port of No. 1 second selector $30_1$, the third port of No. 2 second selector $30_2$, the second port of No. 3 second selector $30_3$, and the first port of No. 4 second selector $30_4$.

In this transposition circuit, data inputted in parallel to the input terminals $14_i$ for each row is sent to the prescribed ports of the first selectors $28_j$. Prescribed ports of the first selectors $28_j$ are selected as input ports in accordance with selection signals from the control unit 32. Data sent to these input ports is stored in prescribed RAM $26_j$. Consequently, data packets inputted in parallel are stored in individual RAM $26_j$. The storage location of data in each RAM $26_j$ is specified by address signals $A_j$ from the control unit 32.

Data stored in the storage areas specified by the address signals $A_j$ is read from RAM $26_j$ in accordance with the address signals $A_j$ from the control unit 32. The data thus read is sent to the prescribed ports of second selectors $30_i$. Prescribed ports of the second selectors $30_i$ are selected as input ports in accordance with selection signals from the control unit 32. Data sent to these input ports is outputted to prescribed output terminals $16_i$.

Figure 4:
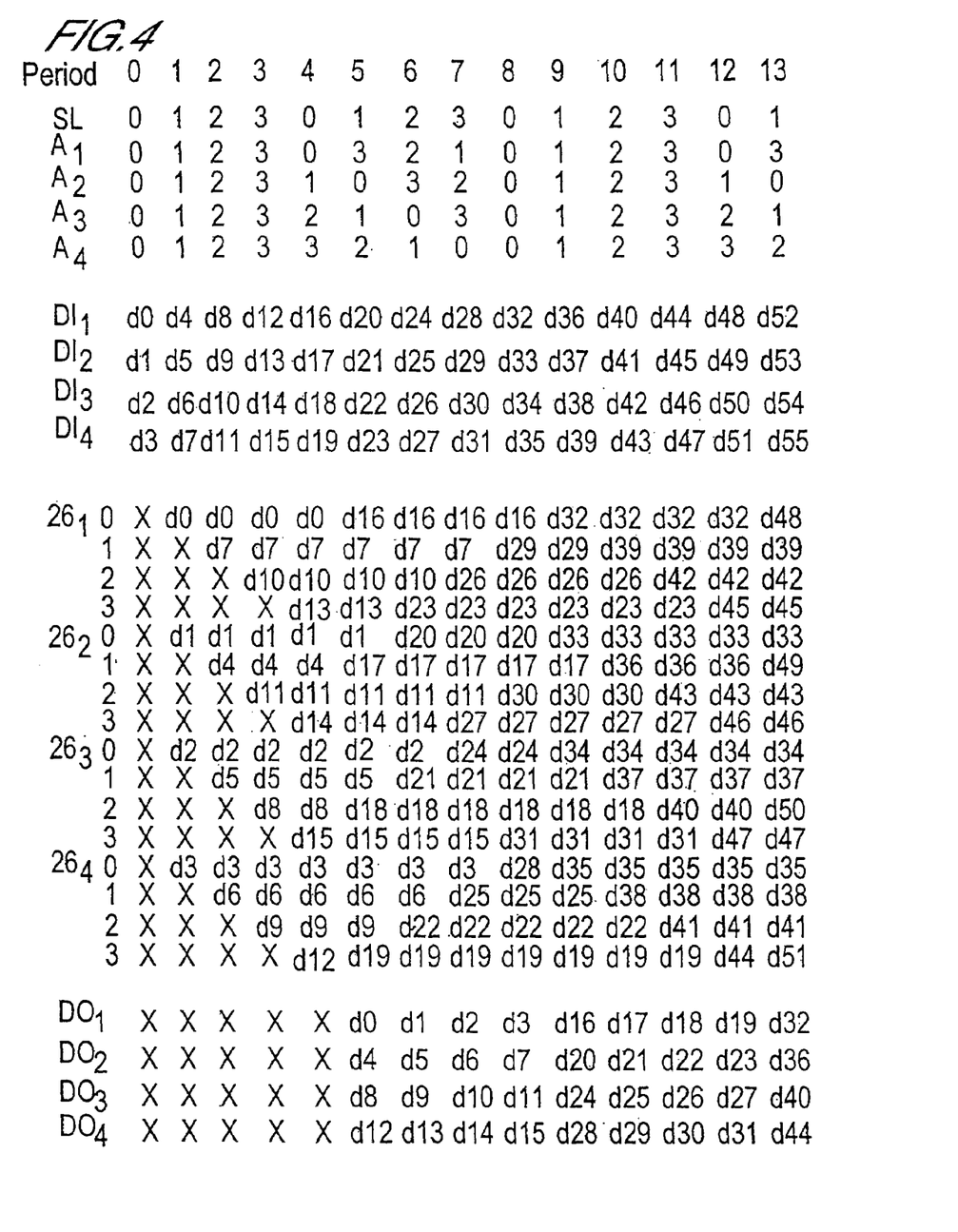
FIG. 4 is a timing chart depicting the operation of the transposition circuit of the second embodiment.

The operation of the transposition circuit of the second embodiment will now be described in detail with reference to FIG. 4. FIG. 4 is a timing chart depicting the operation of the transposition circuit of the second embodiment.

In this transposition circuit, data d0 to d15, d16 to d31, d32 to d47, . . . in a 4×4 matrix format are inputted in parallel as input data $DI_i$ in groups of four packets to input terminals $14_i$. The data is outputted in parallel as output data $DO_i$ in groups of four packets from output terminals $16_i$.

In this transposition circuit, eight periods are needed to process a data packet corresponding to a single matrix. Of the eight periods, the first four periods are used to count up the values of selection signals SL and address signals $A_i$ from 0 to 3 in increments of one for each period. The last four periods are used to count up the values of the selection signals SL from 0 to 3 in increments of one for each period. The values of the address signals $A_i$ are counted down according to quaternary notation in increments of one for each period, with (i−1) as the initial value. During the last four periods, therefore, the value of the address signal $A_1$ changes in the order 0, 3, 2, 1 with each period, with 0 as the initial value. Similarly, the value of the address signal $A_2$ changes in the order 1, 0, 3, 2 with each period, with 1 as the initial value. Similarly, the value of the address signal $A_3$ changes in the order 2, 1, 0, 3 with each period, with 2 as the initial value. Similarly, the value of the address signal $A_4$ changes in the order 3, 2, 1, 0 with each period, with 3 as the initial value.

During period 0, which is shown in FIG. 4, the values of the selection signals SL and address signals $A_i$ outputted from the control unit 32 are all set to 0. At this time, data d0 to d3 are inputted as input data $DI_1$ to $DI_4$ to the input terminals $14_1$ to $14_4$, respectively. The destination for the data d0 to d3 transferred during the subsequent period 1 is determined based on the corresponding values of the selection signals SL and address signals $A_i$.

Specifically, during period 1 first ports are used as input ports for the first selectors $28_1$ to $28_4$. During period 1, therefore, the data do, d1, d2, and d3 inputted to the input terminals $14_1$ to $14_4$ during period 0 are written to the corresponding RAM $26_1$, $26_2$, $26_3$, and $26_4$ via the first selectors $28_1$, $28_2$, $28_3$, and $28_4$. In addition, the data d0, d1, d2, and d3 are written to addresses 0 of the corresponding RAM $26_1$, $26_2$, $26_3$, and $26_4$.

During period 1, the values of the selection signals SL and address signals $A_i$ outputted from the control unit 32 are all set to 1. At this time, data d4 to d7 are inputted as input data $DI_1$ to $DI_4$ to the input terminals $14_1$ to $14_4$, respectively. The destination for the data d4 to d7 transferred during the subsequent period 2 is determined based on the corresponding values of the selection signals SL and address signals $A_i$.

Specifically, during period 2 second ports are used as input ports for the first selectors $28_1$ to $28_4$. During period 2, therefore, the data d4, d5, d6, and d7 inputted to the input terminals $14_1$ to $14_4$ during period 1 are written to the corresponding RAM $26_2$, $26_3$, $26_4$, and $26_1$ via the first selectors $28_2$, $28_3$, $28_4$, and $28_1$. In addition, the data d4, d5, d6, and d7 are written to addresses 1 of the corresponding RAM $26_2$, $26_3$, $26_4$, and $26_1$.

During period 2, the values of the selection signals SL and address signals $A_i$ outputted from the control unit 32 are all set to 2. At this time, data d8 to d11 are inputted as input data $DI_1$ to $DI_4$ to the input terminals $14_1$ to $14_4$, respectively. The destination for the data d8 to d11 transferred during the subsequent period 3 is determined based on the corresponding values of the selection signals SL and address signals $A_i$.

Specifically, during period 3 third ports are used as input ports for the first selectors $28_1$ to $28_4$. During period 3, therefore, the data d8, d9, d10, and d11 inputted to the input terminals $14_1$ to $14_4$ during period 2 are written to the corresponding RAM $26_3$, $26_4$, $26_1$, and $26_2$ via the first selectors $28_3$, $28_4$, $28_1$, and $28_2$. In addition, the data d8, d9, d10, and d11 are written to addresses 2 of the corresponding RAM $26_3$, $26_4$, $26_1$, and $26_2$.

During period 3, the values of the selection signals SL and address signals $A_i$ outputted from the control unit 32 are all set to 3. At this time, data d12 to d15 are inputted as input data $DI_1$ to $DI_4$ to the input terminals $14_1$ to $14_4$, respectively. The destination for the data d12 to d15 transferred during the subsequent period 4 is determined based on the corresponding values of the selection signals SL and address signals $A_i$.

Specifically, during period 4 fourth ports are used as input ports for the first selectors $28_1$ to $28_4$. During period 4, therefore, the data d12, d13, d14, and d15 inputted to the input terminals $14_1$ to $14_4$ during period 3 are written to the corresponding RAM $26_4$, $26_1$, $26_2$, and $26_3$ via the first selectors $28_4$, $28_1$, $28_2$, and $28_3$. In addition, the data d12, d13, d14, and d15 are written to addresses 3 of the corresponding RAM $26_4$, $26_1$, $26_2$, and $26_3$.

During period 4, the control unit 32 sets the value of the selection signal SL to 0, the value of the address signal $A_1$ to 0, the value of the address signal $A_2$ to 1, the value of the address signal $A_3$ to 2, the value of the address signal $A_4$ to 3. At this time, data d16 to d19 are inputted as input data $DI_1$ to $DI_4$ to the input terminals $14_1$ to $14_4$, respectively. The destination for the data d16 to d19 transferred during the subsequent period 5 is determined based on the corresponding values of the selection signals SL and address signals $A_i$.

During period 5, data stored in prescribed storage areas of RAM $26_i$ is first read based on the address signals $A_i$ set during period 4. Specifically, the following data packets are read: data d0 stored at address 0 of RAM $26_1$, data d4 stored at address 1 of RAM $26_2$, data d8 stored at address 2 of RAM $26_3$, and data d12 stored at address 3 of RAM $26_4$. During period 5, first ports are used as input ports for the second selectors $30_1$ to $30_4$ on the basis of the values of the selection signals SL set during period 4. Consequently, data d0, d4, d8, and d12 that have been read from RAM $26_i$ are outputted as output data $DO_1$ to $DO_4$ from the corresponding output terminals $16_1$, $16_2$, $16_3$, and $16_4$ via the second selectors $30_1$, $30_2$, $30_3$, and $30_4$.

During period 5, first ports are used as input ports for the first selectors $28_1$ to $28_4$. During period 5, therefore, the data d16, d17, d18, and d19 inputted to the input terminals $14_1$ to $14_4$ during period 4 are written to the corresponding RAM $26_1$, $26_2$, $26_3$, and $26_4$ via the first selectors $28_1$, $28_2$, $28_3$, and $28_4$. These data d16, d17, d18, and d19 are written to address 0 of RAM $26_1$, address 1 of RAM $26_2$, address 2 of RAM $26_3$, and address 3 of RAM $26_4$, respectively.

During period 5, the control unit 32 sets the value of the selection signal SL to 1, the value of the address signal $A_1$ to 3, the value of the address signal $A_2$ to 0, the value of the address signal $A_3$ to 1, the value of the address signal $A_4$ to 2. At this time, data d20 to d23 are inputted as input data $DI_1$ to $DI_4$ to the input terminals $14_1$ to $14_4$, respectively. The destination for the data d20 to d23 transferred during the subsequent period 6 is determined based on the corresponding values of the selection signals SL and address signals $A_i$.

During period 6, data stored in prescribed storage areas of RAM $26_i$ is first read based on the address signals $A_i$ set during period 5. Specifically, the following data packets are read: data d13 stored at address 3 of RAM $26_1$, data d1 stored at address 0 of RAM $26_2$, data d5 stored at address 1 of RAM $26_3$, and data d9 stored at address 2 of RAM $26_4$. During period 6, second ports are used as input ports for the second selectors $30_1$ to $30_4$ on the basis of the values of the selection signals SL set during period 5. Consequently, data d1, d5, d9, and d13 that have been read from RAM $26_i$ are outputted as output data $DO_1$ to $DO_4$ from the corresponding output terminals $16_1$, $16_2$, $16_3$, and $16_4$ via the second selectors $30_1$, $30_2$, $30_3$, and $30_4$.

During period 6, second ports are used as input ports for the first selectors $28_1$ to $28_4$. During period 6, therefore, the data d20, d21, d22, and d23 inputted to the input terminals $14_1$ to $14_4$ during period 5 are written to the corresponding RAM $26_2$, $26_3$, $26_4$, and $26_1$ via the first selectors $28_2$, $28_3$, $28_4$, and $28_1$. These data d20, d21, d22, and d23 are written to address 0 of RAM $26_2$, address 1 of RAM $26_3$, address 2 of RAM $26_4$, and address 3 of RAM $26_1$, respectively.

The values of the selection signals SL and address signals $A_i$ for each period are thus set in accordance with the above-described prescribed sequence to control the storage locations of data written to RAM $26_i$ and the sequence for reading data from RAM $26_i$. Data packets arranged as a matrix can be transposed as a result.

The transposition circuit thus outputs data in parallel in packets of four for each matrix column when this data is inputted in parallel in packets of four for each matrix row. In other words, data packets inputted as a matrix are outputted as data packets in the form of a transposed matrix obtained by interchanging the rows and columns of the original matrix.

In addition, the time needed to process the data packets of a single matrix corresponds to 2N periods because N data packets are processed by the transposition circuit during each period. The processing time is thus reduced to 1/N of conventional time.

Another advantage of the proposed transposition circuit is that data packets arranged as a matrix of any size (N or less) can be processed without modifying the circuitry as a result of the fact that the selection signals SL and address signals $A_i$ generated by the control unit 32 can be made programmable.

The present invention is not limited by the above-described examples and can be modified in a variety of ways. Examples of such modifications are described as (a) to (c) below.

(a) The invention is not limited by a 4×4 matrix and can be adapted to any N×N square matrix.

(b) The RAM $26_i$ in FIG. 3 are 2-port RAM devices, but because the reading addresses and writing addresses are the same, it is possible to use regular RAM devices by setting write timing on the basis of write control signals.

(c) Although the transposition circuits in the above examples were described with reference to cases in which data was sequentially inputted by matrix row and was sequentially read by matrix column, it is also possible to use an arrangement in which data is sequentially inputted by matrix column and is sequentially read by matrix row.

What is claimed is:

1. A transposition circuit for generating data packets arranged as a transposed matrix and obtained from data packets in the form of an N×N matrix (where N is an integer of 2 or greater) by interchanging rows and columns of an original matrix, wherein N input terminals and N output terminals are provided;

wherein N packets of data are output in parallel for each matrix column from said output terminals when N packets of data are input in parallel for each matrix row to said input terminals;

wherein the transposition circuit is provided with N memory units having storage areas to accommodate N data packets, N input selectors having output ports individually connected to input ports of the memory units, N output selectors having output ports individually connected to said output terminals, and a control unit;

wherein said input and output selectors having N ports, and any of the ports of said input and output selectors are used as an input port in accordance with a common selection signal from said control unit to said input and output selectors;

wherein the ports of said input selectors are connected to corresponding ones of the input terminals;

wherein the ports of said output selectors are connected to output ports of corresponding ones of the memory units; and wherein said control unit generates the common selection signal, and produces address signals to specify a common storage area for each of the memory units, to both read data from and write data to the common storage areas during a same period.

2. The transposition circuit of claim 1, wherein the memory units are units of random access memory.

3. The transposition circuit of claim 1, wherein N is 4.

4. The transposition circuit of claim 3, wherein the first input terminal is connected to the first port of the first input selector, the second port of the second input selector, the third port of the third input selector, and the fourth port of the fourth input selector;

wherein the second input terminal is connected to the fourth port of the first input selector, the first port of the second input selector, the second port of the third input selector, and the third port of the fourth input selector;

wherein the third input terminal is connected to the third port of the first input selector, the fourth port of the second input selector, the first port of the third input selector, and the second port of the fourth input selector;

wherein the fourth input terminal is connected to the second port of the first input selector, the third port of the second input selector, the fourth port of the third input selector, and the first port of the fourth input selector;

wherein the first through fourth input selectors have output ports individually connected to the input ports of the first through fourth memory units;

wherein the output port of the first memory unit is connected to the first port of the first output selector, the fourth port of the second output selector, the third port of the third output selector, and the second port of the fourth output selector;

wherein the output port of the second memory unit is connected to the second port of the first output selector, the first port of the second output selector, the fourth port of the third output selector, and the third port of the fourth output selector;

wherein the output port of the third memory unit is connected to the third port of the first output selector, the second port of the second output selector, the first port of the third output selector, and the fourth port of the fourth output selector;

wherein the output port of the fourth memory unit is connected to the fourth port of the first output selector, the third port of the second output selector, the second port of the third output selector, and the first port of the fourth output selector; and wherein the output ports of the first through fourth output selectors are individually connected to the first through fourth output terminals.

5. The transposition circuit of claim 4, wherein the memory units are units of random access memory.

6. The transposition circuit of claim 4, wherein a data packet corresponding to a single 4×4 matrix is processed in eight periods;

wherein during a first four periods, values of said selection signal and i address signals increase from 0 to 3 in increments of one for each period;

wherein during a last four periods, the values of said selection signal increases from 0 to 3 in increments of one for each period and the i address signals decrease in increments of one for each period with (i−1) as an initial value;

wherein the first through fourth input selectors and the first through fourth output selectors select the first, second, third, and fourth ports of the memory units as input ports when the selection signals respectively assume values of 0, 1, 2 and 3; and wherein when the address signals assume values of 0, 1, 2 and 3, the i address signals specify addresses 0, 1, 2, and 3 as common storage areas of the memory units, respectively.

7. The transposition circuit of claim 1, wherein the memory units are units of 2-port random access memory.

8. A transposition circuit comprising:

N input terminals, wherein N is an integer greater than 2;

N output terminals;

N input selectors each having N input ports coupled to the N input terminals and each having an output port, the N input selectors providing data from one of the input ports as an output responsive to a common selection signal;

N memory units having storage areas for N packets of data and each having an input port coupled to respectively different ones of the output ports of the N input selectors;

N output selectors each having N input ports coupled to the output ports of the N memory units and each having an output port coupled to respectively different ones of the N output terminals, the N output selectors respectively providing data from one of the input ports thereof as an output responsive to the common selection signal; and a controller that provides the common selection signal, and that provides address signals to the N memory units to designate common storage areas, wherein data is both written into and read out from the common storage areas during a same period.

9. The transposition circuit of claim 8, wherein N=4.

10. The transposition circuit of claim 8, wherein the N memory units are random access memories.

* * * * *